Patented Feb. 26, 1952

2,587,574

UNITED STATES PATENT OFFICE 2,587,574

PENICILLIN SALT OF (1,1-DIMETHYL-2-HYDROXYPROPYL)AMINE

Vernon V. Young, Terre Haute, Ind., assignor to Commercial Solvents Corporation, Terre Haute, Ind., a corporation of Maryland No Drawing. Application February 21, 1950, Serial No. 145,588

1 Claim. (Cl. 260—239.1)

This invention relates to salts of penicillin and more particularly it relates to the penicillin salt of (1,1-dimethyl-2-hydroxypropyl)amine.

All penicillin salts are not practical for therapeutic use. For example, a penicillin salt may not be stable at ordinary temperatures and thus in order for the therapeutic activity of the salt to be retained, it must be refrigerated during storage or else rapid deterioration of the therapeutic activity occurs. Some penicillin salts are too toxic for use therapeutically and hence must be ruled out completely.

In addition to the stability and toxicity characteristics of penicillin salts consideration must also be given to their solubility properties. The expression of favorable solubility properties is found in the measurement of blood levels of the penicillin at intervals after injection into or ingestion by the body. The longer penicillin can be found in the blood after it has been placed in the body, the more effective it is against the pathogenic organisms present in the body, provided they are penicillin susceptible. If, however, high blood levels of penicillin are only maintained for short periods after injection or ingestion of the penicillin salt, the penicillin content of the salt is largely wasted and there is little or no alleviation of the pathologic condition being treated unless there are repeated administrations of the penicillin salt at short intervals.

The object of the present invention is to provide a stable penicillin salt composition of low toxicity which gives prolonged blood levels of penicillin whether given orally or by injection.

I have now discovered a stable penicillin salt possessing low toxicity characteristics which gives prolonged blood levels after being injected into the body or after being administered orally. My new composition is the penicillin salt of (1,1-dimethyl-2-hydroxypropyl)-amine.

My new composition can be prepared by mixing one equivalent of a water-soluble penicillin salt such as potassium penicillin in aqueous solution with one equivalent of (1,1-dimethyl-2-hydroxypropyl)amine hydrochloride in aqueous solution. The penicillin salt of (1,1-dimethyl-2-hydroxypropyl)amine which precipitates as the hydrate from the aqueous solution, is recovered therefrom by filtration and dried. (Nitrogen analysis: Calculated—9.22%; found—9.07%.)

Blood level tests were conducted wherein my new penicillin salt of (1,1-dimethyl-2-hydroxypropyl)amine was given orally, and injected intramuscularly into dogs, the amount of penicillin in the blood stream being measured at definite intervals after administration. The following table shows the blood levels obtained after a portion of my new compound containing 100,000 units of penicillin was administered orally.

TABLE I

*Oral administration—100,000 units/dog units penicillin/ml. blood*

| Dog No. | Hours | | | | Remarks |
|---|---|---|---|---|---|
|  | 0 | 2 | 4 | 6 |  |
| 56 | 0 | .292 | .060 | 0 | Capsule. |
| 49 | 0 | 1.80 | .217 | .034 | Do. |
| 61 | 0 | .162 | .055 | 0 | Do. |
| 35 | 0 | .300 | 0 | 0 | Tablet. |
| 38 | 0 | .107 | 0 | 0 | Do. |

The following table indicates blood levels obtained when my new composition was injected intramuscularly as suspension in peanut oil, 40,000 units of penicillin being injected into each dog.

TABLE II

*Intramuscularly—Oil suspension—40,000 units/dog units penicillin/ml. blood*

| Dog No. | Hours | | | |
|---|---|---|---|---|
|  | 0 | 12 | 24 | 48 |
| 79 | 0 | ------ | .220 | .028 |
| 9 | 0 | ------ | .190 | 0 |
| 32 | 0 | ------ | .125 | 0 |
| 52 | 0 | ------ | .149 | 0 |
| 55 | 0 | ------ | .069 | .067 |
| 56 | 0 | ------ | .107 | 0 |

The following table indicates blood levels obtained when my new composition was injected intramuscularly as an aqueous suspension, 60,000 units of penicillin being injected into each dog.

TABLE III

*Intramuscularly — Aqueous suspension — 60,000 units/dog units penicillin/ml. blood*

| Dog No. | Hours | | | |
|---|---|---|---|---|
|  | 0 | 1 | 2 | 6 |
| 32 | 0 | 1.87 | 1.3 | 0.0 |
| 51 | 0 | 1.92 | 1.34 | 0.078 |

The following table shows the results of toxicity tests of my new compound conducted on laboratory mice. The table shows the amount of my new compound which can be administered without any mouse fatalities, the amount given to produce a 50% kill of the mice tested, and the amount required to give a 100% kill of the mice tested. The penicillin salt was injected intraperitoneally and subcutaneously as indicated in the table.

TABLE IV
*Toxicity*

|  | $LD_0$ | $LD_{50}$ | $LD_{100}$ |
|---|---|---|---|
|  | Mg. of salt/kg. of body weight of test mice | | |
| Intraperitoneally | 1,000 | 2,200 | 4,000 |
| Subcutaneously | | | >1,600 |

The following table is offered for comparative purposes. It shows the toxicity characteristics of procaine penicillin when administered in the same manner as in the previous experiment.

TABLE V
*Toxicity of procaine penicillin*

|  | $LD_0$ | $LD_{50}$ | $LD_{100}$ |
|---|---|---|---|
|  | Mg. of salt/kg. of body weight of test mice | | |
| Intraperitoneally | 200 | 440±28 | >550 |
| Subcutaneously | 1,600 | >1,600 | >1,600 |

From the preceding table, it can be seen that my new penicillin compound is less toxic than the form of penicillin previously considered to be the best available. Thus it can be used in amounts previously prohibited because of toxicity to the subject.

Besides the toxicity characteristics shown in Table IV, no tissue irritations were observed when 1600 mg. of my penicillin salt of (1,1-dimethyl-2-hydroxypropyl)amine per kg. of body weight of the test mice was injected intraperitoneally and subcutaneously.

My new composition is a therapeutically effective veterinary compound and is useful in treating diseases in animals caused by penicillin susceptible organisms.

Now having disclosed my invention what I claim is:

The penicillin salt of (1,1-dimethyl-2-hydroxypropyl)amine.

VERNON V. YOUNG.

REFERENCES CITED

The following references are of record in the file of this patent:

UNITED STATES PATENTS

| Number | Name | Date |
|---|---|---|
| 2,493,625 | Goldberg et al. | Jan. 3, 1950 |
| 2,504,182 | Cooper | Apr. 18, 1950 |

OTHER REFERENCES

Ballaro, "Ciencia e Investigation," vol. 4, Nov. 1948, pp. 481 and 482.